United States Patent Office 3,420,806
Patented Jan. 7, 1969

3,420,806
REGULAR HIGH POLYMERS OF FLUORINATED STYRENES AND PROCESS FOR PRODUCING THE SAME
Giulio Natta and Dario Sianesi, Milan, Italy, assignors to Montecatini Edison S.p.A., Milan, Italy
No Drawing. Filed Mar. 20, 1959, Ser. No. 800,646
Claims priority, application Italy, Mar. 25, 1958, 4,501/58
U.S. Cl. 260—91.5    14 Claims
Int. Cl. C08f 7/06

This invention relates to polymers of substituted styrene characterized by a regular structure. More particularly, the invention relates to such structurally regular polymers of styrenes substituted in the nucleus by at least one fluorine atom, and to processes for the production of the polymers.

The Italian patent No. 606,005 discloses the production of linear, structurally regular (isotactic) polymers of certain nuclearly substituted styrenes by polymerizing the monomers with catalysts prepared from compounds, e.g. halides of transition metals of Groups IV to VI of the Mendeleeff Periodic Table and organometallic compounds of elements of Groups II to III of the table.

Of those nuclearly substituted styrenes which are disclosed in the pending application, only a few are polymerized by the catalysts mentioned to products having a high degree of crystallinity and a melting temperature sufficiently high to adopt the polymers to a variety of practical uses. For example, when ortho-methylstyrene is polymerized in contact with a catalyst of the type aforesaid, the polymers obtained have, prevailingly, the stereoregular structure which Natta has termed the "isotactic" structure (see JACS, Mar. 20, 1955) are highly crystallizable, and have a high melting temperature. On the other hand, while both para-methylstyrene and para-chlorostyrene are readily polymerized by means of said catalysts, the polymers obtained are not crystallizable.

In general, substituents in the para position on the styrene nucleus are not an obstacle to polymerization with the catalysts mentioned, but tend to inhibit the formation of crystallizable polymers.

Considerable difficulties are encountered in the polymerization of o-chlorostyrene which yields only polymers of relatively low molecular weight under conditions that, when applied to p-chlorostyrene, result in high molecular weight polymers.

We have now found that styrenes substituted by fluorine atoms polymerize very readily in contact with the organometallic catalysts, in contrast to the chloro-substituted styrenes. Also we find that, in general, and particularly in the case of o- and p-fluorostyrene, as well as p-fluorostyrene substituted in the ortho position by lower alkyl groups containing 1 to 5 carbon atoms (e.g., p-fluoro-o-methyl styrene or p-fluoro-o-ethyl styrene), the polymers obtained have, prevailingly, the isotactic structure and consequently are highly crystalline when examined at the X-rays.

When the monomer is m-fluoro-styrene, the polymer obtained has a regular structure but is not crystallizable.

Styrene polymers containing fluorine atoms in the nucleus and having the regular structure which is characteristic of our polymers have not been disclosed in the art heretofore. Particularly, crystallizable polymers of nuclearly fluorinated styrene and having the isotactic structure have not been described previously.

Surprisingly, we have found that although our fluorine-containing polymers have a less symmetrical molecule than polystyrene obtained by polymerizing styrene with the organometallic catalysts mentioned, the fluorine-containing polymers not only crystallize well but have a crystallization rate which is higher than the crystallizable polystyrene. Furthermore, the fluorine-containing polymers have a higher crystallinity than is normally exhibited by isotactic polystyrene.

For example, styrene polymers obtained by polymerizing styrene in contact with the organometallic catalysts normally have a roentgenographic crystallinity of about 30% to 40%, and only rarely exhibit a crystallinity much above 40%. In contrast the crystallinity of our crystallizable polymeric fluorine-containing styrenes in much higher than 40%.

The higher crystallization rate of the polymeric fluorostyrenes can be demonstrated as follows:

When a crystallizable isotactic polystyrene obtained by polymerizing styrene with a stereospecific organometallic catalyst is fused and cooled rapidly to the amorphous state, and then annealed at 150° C. (approximately 80° C. below the melting temperature) the time required for actual crystallization of half the crystallizable, isotactic portion of the polymer is about one hour. In the case of the polymeric isotactic fluorostyrenes, on the other hand, and operating under the same conditions, the crystallization requires only a few seconds.

The crystallization rate of the polymers is extremely important in the practical use thereof.

Thus, it is practically impossible to obtain highly crystalline fibers or other manufactured articles of isotactic polystyrene, without resort to special complicated and expensive processes. Pressure-, injection-, and extrusion-molding of the melted polystyrene does not yield well crystallized polymers unless the molded article is kept in the mold for long periods of time. If the article is removed from the mold and then annealed, the annealing causes distortions in the article because of the lower specific volume of the crystalline polymers as compared to that of the amorphous polymer.

However, oriented fibers of the isotactic polymeric fluorine-containing styrenes can be obtained very readily by the methods conventionally used in forming such fibers from polymers having similar melting temperatures, such as nylon and "Dacron." Molded articles can also be obtained from the fluorostyrene polymers by conventional pressure, extrusion and injection techniques. Crystallizable polymers can be obtained also by polymerizing directly mixtures of different fluorostyrene isomers.

The mixtures of different fluorostyrene isomers can be polymerized in contact with the stereo-specific organometallic catalysts, such as the catalyst obtained by (a) starting with a highly crystalline halide of the transition metal in which the metal has a valency not higher than 3, e.g. $TiCl_3$, and (b) mixing such halide with the organometallic compound e.g. $Al(C_2H_5)_3$, to obtain new crystallizable polymers.

As shown by examples given hereinbelow, when a mixture of isomeric fluorostyrenes obtained by the dehydrogenation of a fluoroethyl benzene isomer mixture (66% ortho-isomer, 19% para-isomer, 15% meta-isomer) is polymerized in contact with a stereospecific catalyst, there is obtained a crystalline polymer the structure of which (as shown in Table I) is different in part from the structure of poly-ortho-fluorostyrene, while the structure of the latter is preserved.

TABLE I

| | Poly-o-fluorostyrene—Example 1 | Polymer from fluorostyrene isomer mixture—Example 5 |
|---|---|---|
| Melting point (° C.) | 270–5 | About 260 |
| Identity period along fibre axis, (A) | 6.6 | 6.65±0.05 |

POWDER SPECTRUM REGISTERED WITH GEIGER COUNTER

[Cu-Kα]

| Relative intensity | d hkl | Relative intensity | d hkl |
|---|---|---|---|
| V.S. | 11.1 | V.W. | 11.1 |
| M. | 6.4 | V.W. | 6.4 |
| M.S. | 5.6 | M.S. | 5.6 |
| V.S. diffused | 5.0 | V.S. diffused | 5.0 |
| M.S. | 4.2 | M. | 4.2 |
| M. diffused | 3.7 | M. diffused | 3.7 |
| M. diffused | 3.2 | M. diffused | 3.2 |

V.S.=very strong, M.=medium, M.S.=medium strong, V.W.=very weak.

The distances between lattice planes and the identity period along the fiber axis are practically the same for both the poly-ortho-fluorostyrene and the polymer obtained from the fluorostyrene mixture. This corresponds to an equal relative arrangement of the spiral-shaped molecules.

However, the relative intensity of the various reflexes observed in the spectra of both polymers indicates considerable differences between the poly-ortho-fluorostyrene and the polymer obtained from the mixed isomers. These differences can be explained only by assuming that, during polymerization of the isomer mixture, the possibility exists of units derived from the monomers substituted by a fluorine atom in para-or meta-position being arranged in the lattice of the ortho-fluorostyrene polymer.

The possibility of obtaining, from mixtures of the fluorostyrene isomers, crystallizable polymers having properties identical with those of the crystallizable polymers obtainable from the pure monomers, results in a considerable saving in the cost of the polymers and of articles manufactured therefrom.

According to this invention, crystalline polymers can be produced from monomer mixtures obtained, for example, by using as intermediate products monofluorobenzene derivatives prepared by introducing alkyl, oxyalkyl, acetyl or other groups into the benzene nucleus and then subjecting the intermediate to appropriate conversion treatments. For instance, an isomer mixture consisting mainly of o-fluorostyrene but which may also contain other isomers can be obtained by introducing, e.g., ethyl groups into fluorobenzene and then dehydrogenating the product.

Isotactic polymers can thus be obtained from fluorostyrene mixtures by the following steps:

(1) alkylation of fluorobenzene with ethylene and successive separation of a monoethylfluorobenzene mixture through rectification;
(2) partial catalytic dehydrogenation of the ethyl fluorobenzenes to form fluorostyrenes;
(3) polymerization of the mixed fluorostyrenes as described herein.

It is not necessary to separate the fluorostyrenes from any unaltered fluoro-ethylbenzene prior to the polymerization. The fluoro-ethylbenzene remains unchanged during the polymerization of the mixture and can be separated from the largely crystalline polymerizate by simple filtration.

The fluoro-ethylbenzenes may be subjected to successive dehydrogenation to produce fluorostyrenes, optionally after eliminating therefrom any amorphous polymer formed during the polymerization and dissolved in the fluoro-ethylbenzenes. By recycle of the unchanged ethyl-fluorobenzenes after the polymerization, the costly separation of the monomeric fluorostyrenes from the ethyl-fluorobenzene is avoided.

The polymers of styrene nuclearly substituted with fluorine atoms have melting temperatures which are higher than that of the polystyrene but not as high as that of isotactic poly-methylstyrene. This is an important advantage of the present polymers which facilitates manufacturing operations using the methods applied to other plastic materials, since those operations can be carried out at temperatures at which the polymers are thermally stable.

The polymers obtained from the monomeric fluorostyrenes, especially those monomers containing more than one fluorine atom, have good resistance to flammability as compared to polystyrene and other hydrocarbon polymers.

The catalysts used in the present method of polymerizing the fluorostyrenes to linear, structurally regular, high molecular weight polymers are obtained by mixing organometallic compounds of elements belonging to the 2nd and 3rd groups of the Mendeleeff Periodic Table, such as and particularly aluminum alkyls, beryllium alkyls, zinc alkyls and dialkyl aluminum halides, with compounds of transition metals belonging to Groups IV to VI inclusive of the table.

By transition metals we mean the metals so described and discussed at pages 103–106 and in chapter 20 of "Inorganic Chemistry," by T. Moeller, published by Wiley & Sons, New York, 1952.

Suitable compounds of the metals are the halides and halo-alcoholates derived from alcohols having 1 to 6 carbon atoms. Typical transition metal compounds which may be used include titanium trichloride, titanium tetrachloride, halo-alcoholates of titanium such as titanium dichloro-di-isopropylate, the corresponding halides and halo-alcoholates of vanadium and molybdenum and the iron halides. Preferably, the titanium and vanadium chlorides, or their mixtures, are used as the transition metal component of the catalyst.

The molar ratio of the transition metal compound to organometallic compound used in making the catalyst may be from 1:1 to 1:10, usually preferably from 1:2 to 1:6.

The catalysts may be prepared by reacting the transition metal compound and organometallic compound in an inert liquid diluent that is chemically inert to the organometallic compound and to the catalyst formed, and in which the polymerization of the fluorostyrene can be effected. The inert liquid diluent may be an inert hydrocarbon solvent such as, for instance, a light gasoline substantially free of olefinic bonds, n-heptane, and iso-octane. Aromatic solvents such as benzene may also be used.

The transition metal halide and the organometallic compound may be suspended or dispersed separately in a diluent or hydrocarbon solvent of the same kind and the suspensions or dispersions may then be brought together.

The catalyst thus obtained may be further diluted and introduced into an autoclave in which the polymerization catalyst is brought into intimate contact with the monomeric material to be polymerized.

The polymerization may be, and as presently preferred is, carried out in the inert diluent at a temperature of 30° C. to 80° C.

Generally the polymerizates obtained from o- or p-fluorobenzenes or from mixtures of the three isomers in which the monomeric units derived from o-fluorobenzene predominate contain small amounts of amorphous polymers which can be extracted with a solvent such as acetone or ethyl ether, to leave a residue consisting of insoluble, prevailingly isotactic, and highly crystalline polymers.

The molecular weights of the obtained polymers, as evaluated from viscometric measurements, are always considerably in excess of 100,000.

The following examples are given to illustrate the invention it being understood that these examples are not intended to be limiting.

Example 1

0.5 g. TiCl$_4$, dissolved in 20 cc. benzene, are introduced under dry nitrogen into a 250 cc. glass flask fitted with glass stirrer and dropping funnel. The flask is held in a bath regulated at 70° C., and maintained in an atmosphere of inert gas. During a time interval of about 2 minutes, 20 cc. benzene containing 0.90 g. of dissolved triethyl aluminum are added dropwise and, immediately afterwards, 20 g. parafluorostyrene are introduced into the flask.

The reaction is stopped after 24 hours by adding methanol in excess, which decomposes the catalyst present, and coagulates the polymer formed. The polymer, separated from the solution by filtration, is then washed with an additional quantity of methyl alcohol and freed from traces of inorganic salts through digestion with methanol and hydrochloric acid.

The polymer is then subjected to extraction with acetone. After the extraction, 1.5 g. amorphous polymer of low molecular weight can be recovered from the acetone through precipitation with methanol.

As a residue after the acetone extraction 14.1 g. crystalline poly-para-fluorostyrene are obtained which corresponds to a yield of 70% based on the amount of monomer introduced. This polymer is insoluble in methyl-ethyl-ketone, ether and benzene, and soluble in hot tetralin.

The intrinsic viscosity determined at 100° C. in a tetralin solution, is 1.2. The polymer appears highly crystalline when subjected to X-ray examination and the identity period ascertained along the fibre axis is of 8.3 A.

The distances between lattice planes corresponding to the reflexes appearing in a powder spectrum taken with a Geiger counter, are $d_{hkl}$=8.9; 6.0; 5.3; 4.9 and 3.9 A. The melting point (complete disappearance of crystallinity) determined with a polarizing microscope, is between 275° and 280° C.

Example 2

A solution of 0.90 g. $VCl_4$ and 0.33 g. $TiCl_4$ in 20 cc. benzene is introduced into a reaction equipment similar to the one described above, operating in an atmosphere of nitrogen at 40° C., 1.4 g. triethyl aluminum dissolved in 10 cc. benzene and then 20 g. ortho-fluorostyrene are slowly added, under stirring. The reaction is stopped after 24 hours so that, using the treatment of Example 1, 6.8 g. polymer are obtained which is insoluble in acetone, methyl-ethyl-ketone, ether, n-heptane and benzene but may be dissolved in hot tetralin. The intrinsic viscosity determined at 100° C. in a tetralin solution, is 2.3.

On X-ray examination the polymer shows a high degree of crystallinity to which correspond, according to the most intense diffractions, lattice planes having distances $d_{hkl}$=11.1; 5.6; 5.0 and 4.2 A. The identity period along the fiber axis is 6.6 A.; the melting temperature ranges between 270–5° C.

Example 3

0.30 g. $TiCl_3$ in powder form, suspended in 10 cc. benzene, 0.22 g. triethyl aluminum dissolved in 10 cc. benzene, and 20 g. para-fluoro-o-methylstyrene are introduced into a reaction equipment similar to the one described above. operating in an atmosphere of nitrogen at 40° C. After 14 hours of reaction, carried out at 40° C., an addition of methanol in excess coagulates the polymer formed, which is separated, washed and extracted in accordance with the processes already indicated.

0.5 g. of amorphous polymer soluble in acetone and 8.2 g. of crystalline poly-p-fluoro-o-methylstyrene are obtained, the latter being insoluble in boiling ether, methyl-ethyl-ketone, benzene and n-heptane and only partially soluble after prolonged treatment in boiling tetralin.

The polymer shows high crystallinity under X-rays; the planes of the most intense diffractions correspond to lattice distances $d_{hkl}$=9.5; 7.3; 6.3 and 5.1 A.

Under the polarizing microscope using a heating plate, crystallinity is still observed at 360–370° C. The melting point lies slightly above that temperature.

Example 4

1.0 g. $VCl_4$ and 0.33 g. $TiCl_4$, dissolved in 30 cc. benzene, are introduced into a reaction equipment similar to the one described previously in the examples, operating in an atmosphere of nitrogen, and maintained at a temperature of 70° C. by immersion in a thermostatic bath. To this solution which is agitated, are slowly added dropwise 1.42 g. $Al(C_2H_5)_3$ dissolved in 20 cc. benzene. After the preparation of the catalyst, 18 g. m-fluorostyrene are introduced into the reaction vessel and the polymerization is then kept in progress steadily at 70° C. for 7 hours.

The reaction is then stopped by adding methanol in excess, which decomposes the catalyst present and coagulates the polymer formed. After the normal purifying and drying processes, 17.2 g. of poly-f-fluorostyrene are obtained. The polymer is partially (55%) soluble in ethyl ether and completely soluble in acetone, methyl-ethyl ketone, benzene, toluene and tetralin. The intrinsic viscosity determined at 30° C. in toluene on the total polymer is 2.7.

Even after prolonged annealing at temperatures ranging between 100 and 150° C., the polymer remains amorphous under X-ray examination.

Example 5

A solution of 1.0 g. $VCl_4$ and 0.33 g. $TiCl_4$ in a 10 cc. mixture of fluoro-ethylbenzene isomers (consisting of 66% ortho-isomer, 19% para-isomer and 15% meta-isomer) is introduced under nitrogen into a 250 cc. glass flask. The equipment is fitted with a glass stirrer and a graduated dropping funnel for measuring and introduction of the reagents and is maintained in an atmosphere of inert gas and immersed in a thermostatic bath, regulated at 40° C.

To the above solution are added under agitation, 1.43 g. $Al(C_2H_5)_3$ dissolved in 60 cc. of the product obtained through dehydrogenation (carried out at 500–550° C. upon a catalyst based on $Fe_2O_3$ in the presence of steam) of a fluoro-ethyl-benzene isomer mixture whose composition is similar to the one mentioned above. The dehydrogenated product has been distilled for the purpose of separating small quantities of volatile compounds and of moisture as well as small quantities of products with a higher boiling point. The dehydrogenation product this purified has an iodine number of 63, corresponding to a content of 30% by weight of fluorostyrene isomers, a distillation range of between 120–141° C. at 755 mm. and a refractive index $n_D^{15}$=1.4982.

The polymerization is conducted for 14 hours at 40° C. The reaction is then stopped by adding methanol in excess.

9.20 g. of solid polymer are separated, corresponding to a conversion of about 50% of the monomer initially introduced; 58 g. of a mixture consisting of fluoro-ethyl-benzene and fluorostyrene isomers are recovered from the residual liquid after elimination of the excess methanol through washing with water and distillation.

The polymer thus produced is then subjected to extraction with acetone. It comprises a smaller fraction soluble in acetone which is amorphous on X-ray examination even after prolonged annealing at temperatures ranging between 100° and 200° C. The intrinsic viscosity in toluene of this polymer fraction is 1.3 at 30° C. The main fraction which is insoluble in acetone, can not be disssolved in methyl-ethyl-ketone either. It swells in benzene and is soluble in hot tetralin. The intrinsic viscosity in tetralin at 100° C. is 2.94.

This latter fraction appears partially crystalline under the X-rays. The crystallinity increases after annealing for 1½ hours at 200° C. The temperature at which complete disappearance of crystallinity takes place under the polarizing microscope, is about 260° C.

By X-ray examination of the polymer, an identity period along the fibre axis of 6.5±0.05 A. will be found. The distances between lattice planes, corresponding to the reflexes appearing in a spectrum taken with the aid of a Geiger counter, are $d_{hkl}=11.1; 5.6; 5.0; 4.2$ and $3.7$ A.

The foregoing examples clearly demonstrate the regular structure and in the case of certain of the monomers, the crystallinity of the polymers obtained. It will be evident that various changes and modifications can be made in details in practicing the invention without departing from the spirit thereof and, therefor, we intend to include in the scope of the appended claims all such variations and modifications as may be apparent to those skilled in the art from the description and examples given herein.

We claim:

1. A process for polymerizing monofluorinated styrenes selected from the group consisting of ortho-, meta-, and para-fluoro-styrenes, para-fluoro-ortho-alkyl styrene in which the alkyl group contains 1 to 2 carbon atoms, and mixtures thereof, to linear, structurally regular polymers that are solid at normal temperature, which process comprises bringing the monomer into intimate contact, at a temperature of from about 30° C. to about 80° C. and in an inert hydrocarbon solvent, with a catalyst consisting essentially of the product obtained by mixing, in a molar ratio of 1:1 to 6:1, triethyl aluminum with a transition metal catalyst-forming component selected from the group consisting of $TiCl_3$, $TiCl_4$, $VCl_4$ and mixtures of $TiCl_4$ and $VCl_4$, and separating the polymerizate which is produced from the reaction mass.

2. The process according to claim 1, characterized in that the monomeric fluorostyrene has mixed therewith an alkyl-aromatic derivative containing at least one fluorine atom bound to the nucleus.

3. The process according to claim 2, characterized in that the monomer comprises a mixture of fluorostyrenes and fluoro-ethylbenzenes obtained by partial dehydrogenation of fluoro-ethylbenzenes.

4. The process according to claim 1, characterized in that the monomer is para-fluorostyrene.

5. The process according to claim 1, characterized is that the monomer is ortho-fluorostyrene.

6. The process according to claim 1, characterized in that the monomer is para-fluoro-ortho-methylstyrene.

7. The process according to claim 1, characterized in that the monomer is meta-fluorostyrene.

8. The process according to claim 1, characterized in that the monomer consists of the mixture obtained by partially dehydrogenating a starting mixture of o-fluoroethylbenzene, p-fluoro-ethyl benzene and m-fluoro-ethylbenzene in which the o-fluoro-ethylbenzene predominates.

9. Linear, regular polymers of ortho-fluorostyrene characterized in that they are solid at normal temperature, have isotactic structure, exhibit isotactic crystallinity on X-ray examination, and have a melting temperature above 270° C.

10. Linear, regular polymers of para-fluorostyrene characterized in that they are solid at normal temperature, have isotactic structure, exhibit isotactic crystallinity on X-ray examination, and have a melting temperature above 270° C.

11. Linear, regular polymers of para-fluoro-ortho-methylstyrene characterized in that they are solid at normal temperature, have isotactic structure, exhibit isotactic crystallinity on X-ray examination, and have a temperature of complete melting above 360° C.

12. Linear, regular polymers of a mixture of para-, ortho-, and meta-fluorostyrenes in which the ortho-fluorostyrene predominates, said polymers being characterized in that they are solid at normal temperature, have isotactic structure, exhibit isotactic crystallinity on X-ray examination, and have a melting temperature above 250° C.

13. A crystalline homopolymer of a nuclear monofluoro substituted styrene having the following general formula

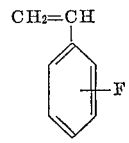

said homopolymer having isotactic structure and a melting point above 240° C.

14. A process for preparing a crystalline homopolymer of a fluorostyrene of formula

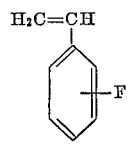

said homopolymer having isotactic structure and a melting point of over 240° C., which process comprises polymerizing said fluorostyrene monomer with a catalyst the starting components of which consist of triethyl aluminum and titanium tetrachloride.

References Cited

UNITED STATES PATENTS

| | | | |
|---|---|---|---|
| 2,406,319 | 8/1946 | Brooks et al. | 260—91.5 |
| 2,881,156 | 4/1959 | Pilar et al. | 260—94.9 |
| 2,226,809 | 12/1940 | Dreisbach | 260—65 |

FOREIGN PATENTS

| | | |
|---|---|---|
| 538,782 | 12/1955 | Italy. |

OTHER REFERENCES

Fox et al., Journal Americal Chemical Society, vol. 80, pp. 1768–9, Apr. 5, 1958. Tobolsky, "Properties and Structure of Polymers," pp. 198–206, John Wiley and Sons, Inc., New York (1960).

JOSEPH L. SCHOFER, Primary Examiner.

HARRY WONG, Jr., Assistant Examiner.

U.S. Cl. X.R.

260—650, 87.5, 33.6, 33.2, 32.8